(12) United States Patent
Makino (10) Patent No.: US 8,441,554 B2
(45) Date of Patent: May 14, 2013

(54) IMAGE CAPTURING APPARATUS CAPABLE OF EXTRACTING SUBJECT REGION FROM CAPTURED IMAGE

(75) Inventor: Tetsuji Makino, Oume (JP)

(73) Assignee: Casio Computer Co., Ltd., Tokyo (JP)

( * ) Notice: Subject to any disclaimer, the term of this patent is extended or adjusted under 35 U.S.C. 154(b) by 598 days.

(21) Appl. No.: 12/717,342

(22) Filed: Mar. 4, 2010

(65) Prior Publication Data

US 2010/0225787 A1 Sep. 9, 2010

(30) Foreign Application Priority Data

Mar. 6, 2009 (JP) ................ P2009-053343

(51) Int. Cl.
*H04N 5/262* (2006.01)
*G06K 9/34* (2006.01)

(52) U.S. Cl.
USPC ................................. 348/239; 382/173

(58) Field of Classification Search ............... 348/222.1, 348/239; 385/173, 174, 190, 195
See application file for complete search history.

(56) References Cited

U.S. PATENT DOCUMENTS

| 6,167,167 | A | 12/2000 | Matsugu et al. | |
|---|---|---|---|---|
| 6,977,664 | B1 * | 12/2005 | Jinzenji et al. | 345/629 |
| 7,324,692 | B2 | 1/2008 | Kanamoto et al. | |
| 8,134,613 | B2 * | 3/2012 | Kondo et al. | 348/239 |
| 8,204,316 | B2 * | 6/2012 | Panahpour Tehrani et al. | 382/224 |

FOREIGN PATENT DOCUMENTS

| JP | 10-21408 A | 1/1998 |
|---|---|---|
| JP | 10-023452 A | 1/1998 |
| JP | 2001-057630 A | 2/2001 |
| JP | 2001057630 A * | 2/2001 |
| JP | 2005-258683 A | 9/2005 |
| JP | 2008-079185 A | 4/2008 |
| JP | 2008-131542 A | 6/2008 |
| JP | 2009-009290 A | 1/2009 |
| JP | 2009-026223 A | 2/2009 |

OTHER PUBLICATIONS

Japanese Office Action dated Feb. 22, 2011 and English translation thereof in counterpart Japanese Application No. 2009-053343.
Japanese Office Action dated Nov. 20, 2012 (and English translation thereof) in counterpart Japanese Application No. 2011-095579.

* cited by examiner

*Primary Examiner* — Timothy J Henn
(74) *Attorney, Agent, or Firm* — Holtz, Holtz, Goodman & Chick, P.C.

(57) ABSTRACT

An image capturing apparatus includes: a first image capturing unit that captures a subject existing image; a first nonflatness calculating unit that calculates nonflatness of a peripheral portion of the subject existing image; a first determination unit that determines whether the nonflatness of the peripheral portion of the subject existing image is higher than a threshold value; a background generating unit that generates an extracting background image from the peripheral portion of the subject existing image when the first determination unit determines that the nonflatness is not higher than the threshold value, the extracting background image serving to extract a subject region containing the subject in the subject existing image; and a subject extracting unit that extracts the subject region from the subject existing image based on difference information of each corresponding pixel between the extracting background image and the subject existing image.

12 Claims, 8 Drawing Sheets

IMAGE CAPTURING APPARATUS CAPABLE OF EXTRACTING SUBJECT REGION FROM CAPTURED IMAGE

CROSS-REFERENCE TO THE RELATED APPLICATION(S)

The present application is based upon and claims priority from prior Japanese Patent Application No. 2009-053343, filed on Mar. 6, 2009, the entire contents of which are incorporated herein by reference.

TECHNICAL FIELD

The present invention relates to an image capturing apparatus, an image processing method, and a computer program for extracting a subject region from a captured image.

BACKGROUND

Conventionally, there has been known an application which uses an image capturing apparatus to capture an image where a subject is present in a background and a background image where the subject is absent, to generate difference information from the background image and the image where the subject is present, and to extract the subject from the captured image. An example of such application is disclosed in JP-A-10-021408.

However, when an image where a subject is present in a background and a background image where the subject is absent are captured in two separate shots as shown in the publication, JP-A-10-021408, the angle of view is likely to move between the two shots. Therefore, a background part may be misidentified as the subject due to a difference in each pixel value of the background itself in a process for extracting the subject, so that the subject may not be extracted properly. In this case, images have to be captured again, and the operation for generating a cut-out image of the subject becomes troublesome.

SUMMARY

One of objects of the present invention is to provide an image capturing apparatus, an image processing method and a program for simply and easily extracting a subject region from an image captured in single shot.

According to a first aspect of the present invention, there is provided an image capturing apparatus including: a first image capturing unit that captures a subject existing image in which a subject is present in a background; a first nonflatness calculating unit that calculates nonflatness of a peripheral portion of the subject existing image captured by the first image capturing unit; a first determination unit that determines whether the nonflatness of the peripheral portion of the subject existing image calculated by the first nonflatness calculating unit is higher than a threshold value; a background generating unit that generates an extracting background image from the peripheral portion of the subject existing image when the first determination unit determines that the nonflatness is not higher than the threshold value, the extracting background image serving to extract a subject region containing the subject in the subject existing image; and a subject extracting unit that extracts the subject region from the subject existing image based on difference information of each corresponding pixel between the extracting background image and the subject existing image.

According to a second aspect of the present invention, there is provided a method for processing an image, the method including: capturing a subject existing image in which a subject is present in a background; calculating nonflatness of a peripheral portion of the subject existing image; determining whether the nonflatness of the peripheral portion of the subject existing image is higher than a threshold value; generating an extracting background image from the peripheral portion of the subject existing image when determined that the nonflatness is not higher than the threshold value, the extracting background image serving to extract a subject region containing the subject in the subject existing image; and extracting the subject region from the subject existing image based on difference information of each corresponding pixel between the extracting background image and the subject existing image.

According to a third aspect of the present invention, there is provided a computer readable medium storing a software program that causes a computer to perform image processing including: capturing a subject existing image in which a subject is present in a background; calculating nonflatness of a peripheral portion of the subject existing image; determining whether the nonflatness of the peripheral portion of the subject existing image is higher than a threshold value; generating an extracting background image from the peripheral portion of the subject existing image when determined that the nonflatness is not higher than the threshold value, the extracting background image serving to extract a subject region containing the subject in the subject existing image; and extracting the subject region from the subject existing image based on difference information of each corresponding pixel between the extracting background image and the subject existing image.

BRIEF DESCRIPTION OF THE DRAWINGS

A general configuration that implements the various features of the present invention will be described with reference to the drawings. The drawings and the associated descriptions are provided to illustrate embodiments of the invention and not to limit the scope of the invention.

DETAILED DESCRIPTION

An embodiment according to the present invention will be described in detail with reference to the accompanying drawings. The scope of the claimed invention should not be limited to the examples illustrated in the drawings and those described below.

Figure 1:
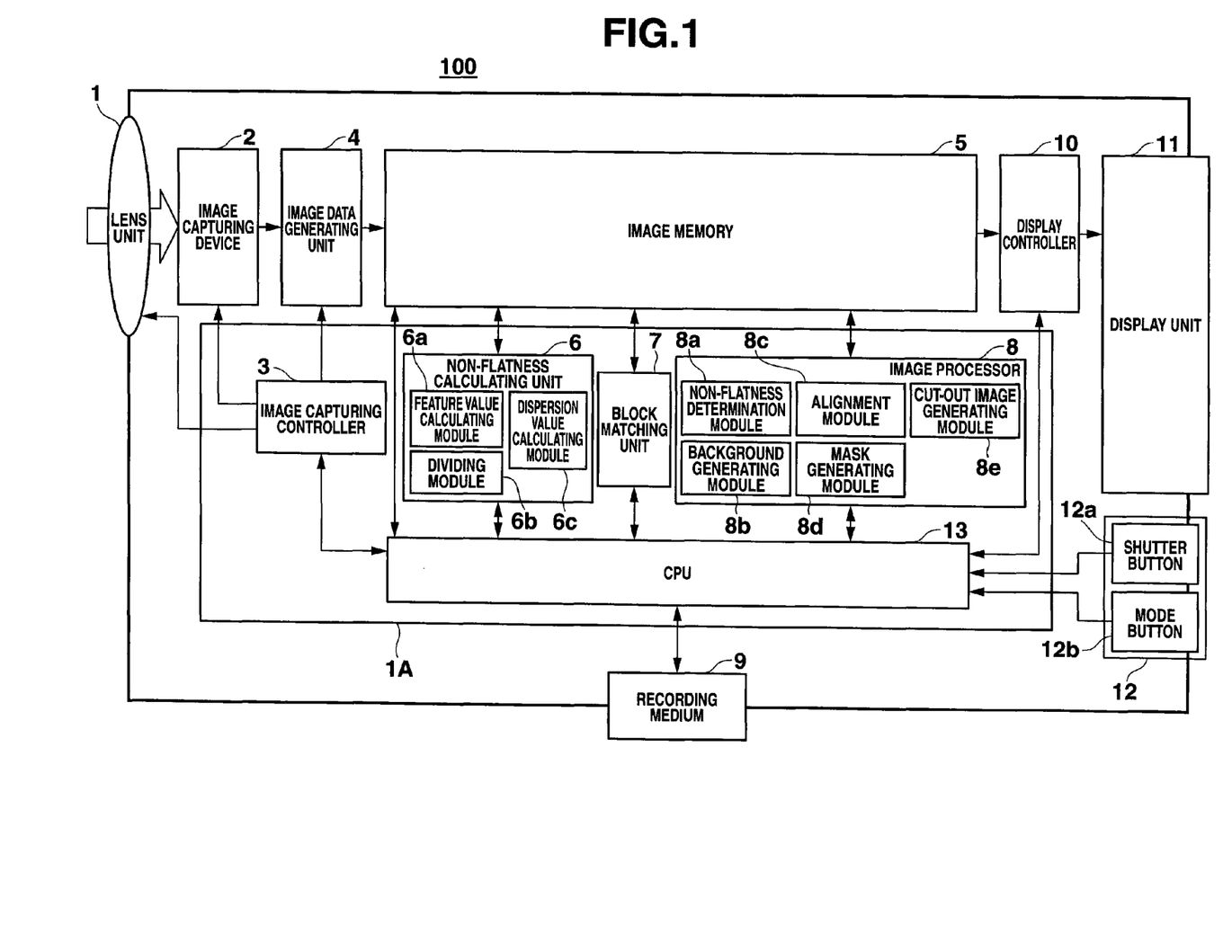
FIG. 1 is a block diagram showing a schematic configuration of an image capturing apparatus according to an embodiment of the present invention.

FIG. 1 is a block diagram showing a schematic configuration of an image capturing apparatus 100 according to an embodiment of the present invention.

When nonflatness of a peripheral portion of a subject existing image P1a where a subject S is present in a background is determined to be not higher than a threshold value, the image capturing apparatus 100 according to this embodiment generates an extracting background image from the peripheral portion of the subject existing image P1a. The extracting background image serves to extract a subject region. The image capturing apparatus 100 extracts the subject region from the subject existing image P1a based on difference information of each corresponding pixel between the extracting background image and the subject existing image P1a.

Specifically, as shown in FIG. 1, the image capturing apparatus 100 has a lens unit 1, an image capturing device 2, an image capturing controller 3, an image data generating unit 4, an image memory 5, a nonflatness calculating unit 6, a block matching unit 7, an image processor 8, a recording medium 9, a display controller 10, a display unit 11, an user interface 12, and a CPU 13.

The image capturing controller 3, the nonflatness calculating unit 6, the block matching unit 7, the image processor 8 and the CPU 13 are, for example, designed as a custom LSI 1A.

The lens unit 1 includes a plurality of optical lenses, such as a zoom lens and a focus lens.

Although not shown in FIG. 1, the lens unit 1 may be provided with a zoom actuator for actuating the zoom lens in its optical axis direction, and a focus actuator for actuating the focus lens in its optical axis direction for capturing an image of the subject S.

The image capturing device 2 is provided with, for example, an image sensor such as a CCD (Charge Coupled Device) or a CMOS (Complementary Metal-Oxide Semiconductor), by which an optical image passing through various lenses of the lens unit 1 is converted into an image signal for displaying two-dimensional image.

Although not shown in FIG. 1, the image capturing controller 3 is provided with a timing generator and a driver. The image capturing controller 3 controls the image capturing device 2 to scan by the timing generator and the driver. Thus, an optical image is converted into an image signal for displaying two-dimensional image with a predetermined period of time by the image capturing device 2. The image capturing controller 3 reads out image frames from an image capturing area of the image capturing device 2 screen by screen. The read image frames are outputted to the image data generating unit 4.

The image capturing controller 3 controls adjustment of image capturing conditions for the subject S, including AF (Automatic Focus), AE (Automatic Exposure), AWB (Automatic White Balance), etc.

A live-view image may be displayed when an image is captured. In such a case, the image capturing controller 3 allows the image capturing device 2 to capture an image of the subject S continuously at a predetermined image capturing frame rate and sequentially generate image frames for displaying the live-view image. Specifically, the image capturing controller 3 allows the image capturing device 2 to capture an optical image of a background image P2 (see FIG. 6B), which has been passed through the lens unit 1 and where the subject S is absent in a background, continuously at a predetermined frame rate and sequentially generates image frames for displaying a live-view image of the background image P2.

In the embodiment, the image capturing lens unit 1, the image capturing device 2 and the image capturing controller 3 serve as a background image capturing unit for capturing the background image P2 where the subject S is absent, and sequentially generating image frames.

A subject cutting-out mode (which will be described later) may be set as an image capturing mode. In this case, based on user's operation on a shutter button 12a to give an image capturing instruction, the image capturing controller 3 allows the image capturing device 2 to convert an optical image of a subject existing image P1a (see FIG. 6C), which has been passed through the lens unit 1 and where the subject S is present in the background, into an image signal for displaying two-dimensional image on predetermined image capturing conditions. The image capturing controller 3 then controls to read out image frames relating to the subject existing image P1a from a corresponding image capturing area of the image capturing device 2.

In the embodiment, the image capturing lens unit 1, the image capturing device 2 and the image capturing controller 3 serve as a first image capturing unit for capturing the subject existing image P1a where the subject S is present in the background.

Figure 8A:
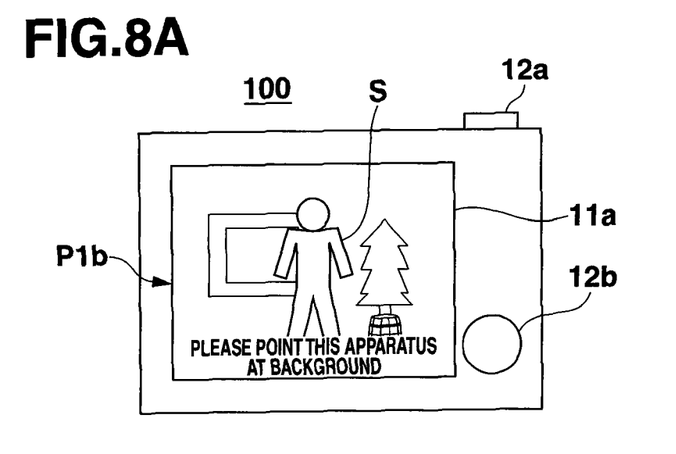
FIGS. 8A-8B are views schematically showing examples of images for explaining the subject cutting-out process of FIG. 2.

A subject existing image P1b (see FIG. 8A) may be captured after it is determined in a nonflatness determination process (which will be described later) of a live-view image (background image P2) that a feature point or a dispersion value of pixel values in a block is higher than a threshold value. In this case, the image capturing controller 3 keeps the state where the image capturing conditions for capturing the subject existing image P1b are fixed. Then, based on user's operation on the shutter button 12a to give an image capturing instruction, the image capturing controller 3 allows the image capturing device 2 to convert an optical image of a subject nonexisting image P3 (see FIG. 8B), which has been passed through the lens unit 1 and where the subject S is absent in the same background as the background of the subject existing image P1b, into an image signal for displaying two-dimensional image on the image capturing conditions fixed after capturing of the subject existing image P1b. The image capturing controller 3 then controls to read out image frames relating to the subject nonexisting image P3 from a corresponding image capturing area of the image capturing device 2.

In the embodiment, the image capturing lens unit 1, the image capturing device 2 and the image capturing controller 3 serve as a second image capturing unit which captures the subject nonexisting image P3 where the subject S is absent in the same background as the background of the subject existing image P1b after capturing of the subject existing image P1b when it is determined in the determination process that the nonflatness is higher than the threshold value.

The image data generating unit 4 performs suitable gain adjustment for each color component of R, G and B on analog values as signals of image frames transmitted from the image capturing device 2. Then, the image data generating unit 4 samples and holds the analog signals in a sample and hold circuit (not shown), converts them into digital data in an A/D converter (not shown), and performs color processing including pixel interpolation processing and γ correction processing in a color processing circuit (not shown). After that, the image data generating unit 4 generates digital values as a luminance signal Y and color-difference signals Cb and Cr (YUV data).

The luminance signal Y and the color-difference signals Cb and Cr outputted from the color processing circuit are DMAtransferred to the image memory 5 through a not-shown DMA controller. The image memory 5 serves as a buffer memory.

A de-mosaic unit (not shown) for developing the A/D converted digital data may be mounted on the custom LSI 1A.

The image memory 5 is, for example, configured by a DRAM or the like, and temporarily stores data processed by the nonflatness calculating unit 6, the block matching unit 7, the image processor 8, and the CPU 13.

The nonflatness calculating unit 6 has a feature value calculating module 6a.

The feature value calculating module 6a performs a feature extraction process for extracting a feature point from the background image P2 or the subject existing image P1a.

Specifically, the feature value calculating module 6a extracts a block region (for example, a square of 16×16 pixels) featured by an abundance of a high frequency component based on the YUV data of the background image P2 generated as image frames for displaying a live-view image.

Figure 7A:
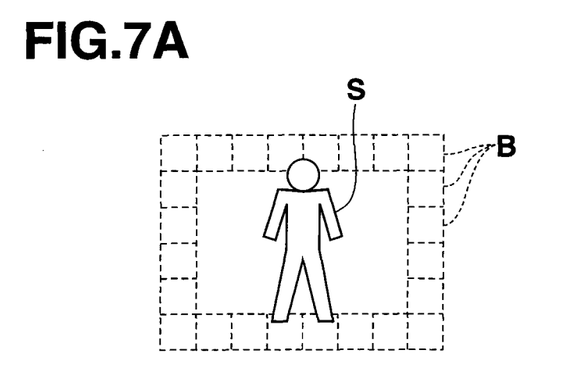
FIGS. 7A-7C are views schematically showing examples of images for explaining the subject cutting-out process of FIG. 2.
Figure 7B:
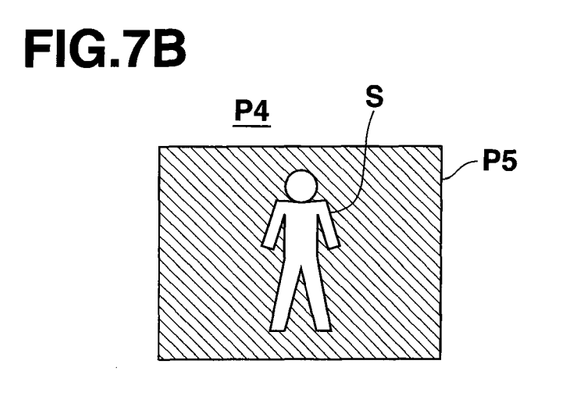

The nonflatness calculating unit 6 has a dividing module 6b for dividing a peripheral portion (see FIG. 7A) of the subject existing image P1a into a plurality of image blocks B based on the YUV data of the subject existing image P1a in the background generating process. The feature value calculating module 6a extracts a feature point from each image block B divided by the dividing module 6b. In the embodiment, the dividing module 6 serves as a dividing module that divides the peripheral portion of the subject existing image P1a into a plurality of image blocks (image regions) B.

In addition, the feature value calculating module 6a performs a process for extracting a feature point from the subject nonexisting image P3 with reference to the subject nonexisting image P3 in a process of alignment between the subject existing image P1b and the subject nonexisting image P3. Specifically, the feature value calculating module 6a selects a predetermined number (or more) of featured block regions (feature points) which are useful for tracking, from a large number of candidate blocks based on the YUV data of the subject nonexisting image P3. The contents of the selected blocks are extracted as templates (each of which is, for example, a square of 16×16 pixels).

In addition, the nonflatness calculating unit 6 has a dispersion value calculating module 6c for calculating a dispersion value of pixel values in each block.

According to the following Expression (1), the dispersion value calculating module 6c calculates a standard deviation as a dispersion value in each block region of the background image P2 generated as image frames for displaying a live-view image.

In addition, according to the following Expression (1), the dispersion value calculating module 6c calculates a standard deviation as a dispersion value for each of the image blocks B in the peripheral portion of the subject existing image P1a in the background generating process.

$$\bar{b} = \frac{1}{N} \sum_{n=1}^{N} b_n \qquad (1)$$

$$\sigma_b = \sqrt{\frac{1}{1-N} \sum_{n=1}^{N} (b_n - \bar{b})^2}$$

-continued $\begin{pmatrix} \text{wherein} \\ b_n\text{: pixel value in block} \\ N\text{: number of pixels in block} \\ \bar{b}\text{: average value of pixel values in block} \\ \sigma_b\text{: standard deviation in block} \end{pmatrix}$ In the Expression (1), for example, a luminance value may be used as the pixel value b in each block region.

In the embodiment, the feature value calculating module 6a and the dispersion value calculating module 6b serve as a first nonflatness calculating unit for calculating nonflatness of the peripheral portion of the subject existing image P1a and a second nonflatness calculating unit for calculating nonflatness of the background image P2.

That is, the feature value calculating module 6a extracts, as the nonflatness, feature points from the peripheral portion of the subject existing image P1a or feature points from the background image P2. On the other hand, the dispersion value calculating module 6c calculates, as the nonflatness, dispersion values of pixel values in the image blocks (image regions) of the peripheral portion of the subject existing image P1a or dispersion values in the block regions (image regions) of the background image P2.

The block matching unit 7 performs a block matching process for alignment between the subject nonexisting image P3 (reference image) and the subject existing image P1b (target image). Specifically, the block matching unit 7 searches for which part each template extracted in the feature extracting process corresponds to in the subject existing image P1b, that is, a position (corresponding region) where the pixel values of the template match optimally in the subject existing image P1b. Then, the optimal offset between the subject nonexisting image P3 and the subject existing image P1b with the best evaluation values of difference degrees of the pixel values (SSD (Sum of Squared Differences), the best SAD (Sum of Absolute Differences) etc.) is calculated as a motion vector of the template.

The image processor 8 has a nonflatness determination module 8a for determining the nonflatness calculated by the nonflatness calculating processing.

The nonflatness determination module 8a determines whether the feature points of the background image P2 generated as image frames for displaying a live-view image, that is, the featured block regions extracted by the feature value calculating module 6a are higher than a threshold value or not (whether the feature values of the background image P2 are higher or not). In addition, the nonflatness determination module 8a determines whether the dispersion values of pixel values in the blocks of the background image P2 calculated by the dispersion value calculating module 6c are higher than a threshold value or not.

In the embodiment, the nonflatness determination module 8a serve as a second determination unit that determines whether the feature points of the background image P2 are higher than a threshold value or not and whether the dispersion values of pixel values in the blocks of the background image P2 are higher than a threshold value or not.

In the background generating process, the nonflatness determination module 8a determines whether the feature points extracted from the image blocks B of the peripheral portion of the subject existing image P1a by the feature value calculating module 6a are higher than a threshold value or not (whether the feature values of the peripheral portion of the subject existing image P1a are higher or not). The nonflatness determination module 8a determines whether the dispersion value of each image block B calculated by the dispersion value calculating module 6c is higher than a threshold value or not.

The nonflatness determination module 8a counts the number of image blocks B each determined to be not higher than the threshold value as to the feature point and to be not higher than the threshold value as to the dispersion value of pixel values in the block. Thus, the nonflatness determination module 8a determines whether the number of the image blocks B determined thus is plural or not.

In the embodiment, the nonflatness determination module 8a serves as a first determination unit that determines whether the feature points of the peripheral portion of the subject existing image P1a are higher than a threshold value or not and whether the dispersion value of pixel values in each of the image blocks B in the peripheral portion is higher than a threshold value or not.

In addition, the image processor has a background generating module 8b that generates an extracting background image for extracting a subject region by use of chroma-key.

Figure 6A:
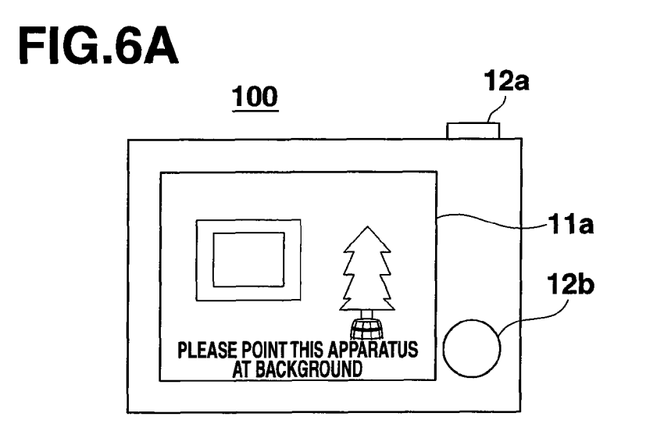
FIGS. 6A-6C are views schematically showing examples of images for explaining the subject cutting-out process of FIG. 2.
Figure 6B:
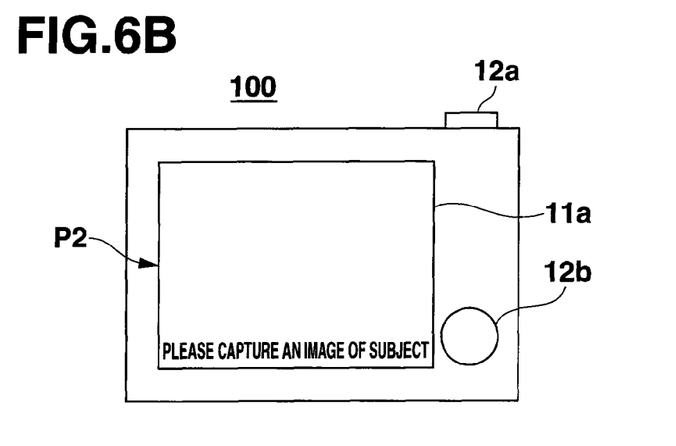

Assume that the nonflatness determination module 8a determines that the number of image blocks B each determined to be not higher than the threshold value as to the feature point of the peripheral portion of the subject existing image P1a and to be not higher than the threshold value as to the dispersion value of pixel values in the block, that is, the number of image blocks B poor in feature value is plural. In this case, the background generating module 8b generates an extracting background image with the same background color as the color of the image blocks B. For example, assume that the subject S is photographed in a solid-color background poor in feature value, as shown in FIG. 6B. In this case, the feature value of the peripheral portion of the subject existing image P1a becomes lower. Thus, an extracting background image having the same color as the peripheral portion of the subject existing image P1a is generated.

The chroma-key is a technique for cutting out the subject S from image data by use of a specific color background. Typically according to the chroma-key, a screen of blue or green as a complimentary color to the subject S is used as the background. An extracting background image having the same color as the peripheral portion of the subject existing image P1a is generated so that a background part and a subject part can be separated from each other based on color information of the extracting background image and the subject existing image P1a.

In the embodiment, the background generating module 8b serves as a background generating unit which generates an extracting background image from the peripheral portion of the subject existing image P1a when the nonflatness of the peripheral portion of the subject existing image P1a is determined to be not higher than the threshold value. The extracting background image serves to extract a subject region containing the subject S in the subject existing image P1a.

The image processor 8 has an alignment module 8c for performing alignment between the subject existing image P1b and the subject nonexisting image P3.

The alignment module 8c performs alignment between the subject existing image P1b and the subject nonexisting image P3 based on the feature points extracted from the subject nonexisting image P3. That is, the alignment module 8c calculates coordinate transformation equations (projective transformation matrix) of each pixel of the subject existing image P1b relative to the subject nonexisting image P3 based on the feature points extracted from the subject nonexisting image P3. The alignment module 8c transforms the coordinates of the subject existing image P1b according to the coordinate transform equations so as to align the subject existing image P1b with the subject nonexisting image P3.

The alignment module 8c operates motions vectors of templates calculated by the block matching unit 7 by majority decision. Thus, a motion vector determined to reach at least a predetermined percentage (e.g. 50%) statistically is set as a general motion vector. A projective transformation matrix of the subject existing image P1b is calculated using a feature point correspondence according to the general motion vector. The alignment module 8c transforms the coordinates of the subject existing image P1b according to the projective transformation matrix so as to align the subject existing image P1b with the subject nonexisting image P3.

In the embodiment, the alignment module 8c serves as an alignment unit for performing alignment between the subject existing image P1b and the subject nonexisting image P3.

The image processor 8 has a mask generating module 8d that generates a mask image for extracting a subject region from the subject existing image P1a (P1b).

The mask generating module 8d calculates a difference degree D of each corresponding pixel between the background image P2 (extracting background image or subject nonexisting image P3) and the subject existing image P1a (P1b) in accordance with the following Expression (2) so as to generate a difference degree map.

$$D=(Yc-Y)^2+G\times((Uc-U)^2+(Vc-V)^2) \quad (2)$$

In the aforementioned Expression (2), "Y", "U" and "V" designate YUV data of the background image, and "Yc", "Uc" and "Vc" designate YUV data of the subject existing image. In addition, G designates a gain of the color difference signals U and V.

The mask generating module 8d binarizes (0, 255) the generated difference degree map with a predetermined threshold to generate a mask image.

The mask generating module 8d performs an erosion process for removing tiny noise, so as to remove pixel sets smaller than a threshold value, and then performs a dilation process for compensating the erosion. After that, the mask generating module 8d also performs a labeling process for labeling pixel sets forming one and the same connected component with one and the same number. Thus, any region whose ratio of an effective area to the number of constituent pixels is lower than a threshold value is replaced by an effective area so that filling can be performed. Further, the mask generating module 8d applies an averaging filter to the region information to give synthetic gradation to the edge portion of the region.

In the embodiment, the mask generating module 8d serves as a mask generating unit that generates a mask image for extracting a subject region from the subject existing image P1a based on the difference degree (difference information) D of each corresponding pixel between the extracting background image and the subject existing image P1a (P1b).

In addition, the image processor 8 has a cut-out image generating module 8e that combines the image of the subject S with a background image P5 of a predetermined single color so as to generate image data of a subject cut-out image P4.

The cut-out image generating module 8e uses chroma-key to cut out a subject region from the subject existing image P1a (P1b) using a mask image generated by the mask generating module 8d, and combines the subject region with a predetermined single-color background image P5. Thus, image data of a subject cut-out image P4 is generated. Due to synthetic gradation given to the edge portion of the mask image, the cut-out subject region and the single-color background image P5 can be combined naturally with an indefinable boundary therebetween.

In the embodiment, the cut-out image generating module 8e serves as a subject extracting unit that extracts a subject region from the subject existing image P1a based on difference information of each corresponding pixel between the extracting background image and the subject existing image P1a (P1b).

The storage medium 9, for example, is provided with a nonvolatile memory (flash memory) or the like. The storage medium 9 stores recording image data of a captured image encoded by a JPEG compression portion (not shown) of the image processor 8.

The mask image generated by the mask generating module 8d of the image processor 8 and the image data of the subject cut-out image P4 are compressed and being associated with each other to be recorded into the recording medium 9. The recording medium 9 saves the image data of the subject cut-out image P4 with an extension of ".jpe".

The display controller 10 controls to read out the display image data temporarily stored in the image memory 5 and display the read-out data on the display unit 11.

Specifically, the display controller 10 has a VRAM, a VRAM controller, a digital video encoder, etc. The digital video encoder reads out the luminance signal Y and the color difference signals Cb and Cr, which have been read from the image memory 5 and stored in the VRAM (not shown) under the control of the CPU 13, periodically from the VRAM through the VRAM controller. Based on the data read out thus, a video signal is generated and outputted to the display unit 11.

The display unit 11 is, for example, a liquid crystal display device, in which an image or the like captured by the image capturing device 2 is displayed on a display screen 11a based on the video signal from the display controller 10. Specifically, the display unit 11 displays a live-view image based on a plurality of image frames generated by capturing an image of the subject S in the image capturing mode by the image capturing lens unit 1, the image capturing device 2 and the image capturing controller 3, or a recording view image captured as an actually photographed image.

The user interface 12 serves to perform a predetermined operation on the image capturing apparatus 100. Specifically, the user interface 12 has a shutter button 12a associated with an instruction to capture an image of the subject S, a mode button 12b associated with an instruction to select an image capturing mode, a function, etc. on a menu screen, a zoom button (not shown) associated with an instruction to adjust a zoom amount, etc. In accordance with the operation of these buttons, a predetermined operation signal is supplied to the CPU 13.

The CPU 13 controls each part of the image capturing apparatus 100. Specifically, the CPU 13 performs various control operations in accordance with various processing programs (not shown) for the image capturing apparatus 100.

Next, a subject cutting-out process according to an image processing method in the image capturing apparatus 100 will be described with reference to FIGS. 2 to 8.

Figure 2:
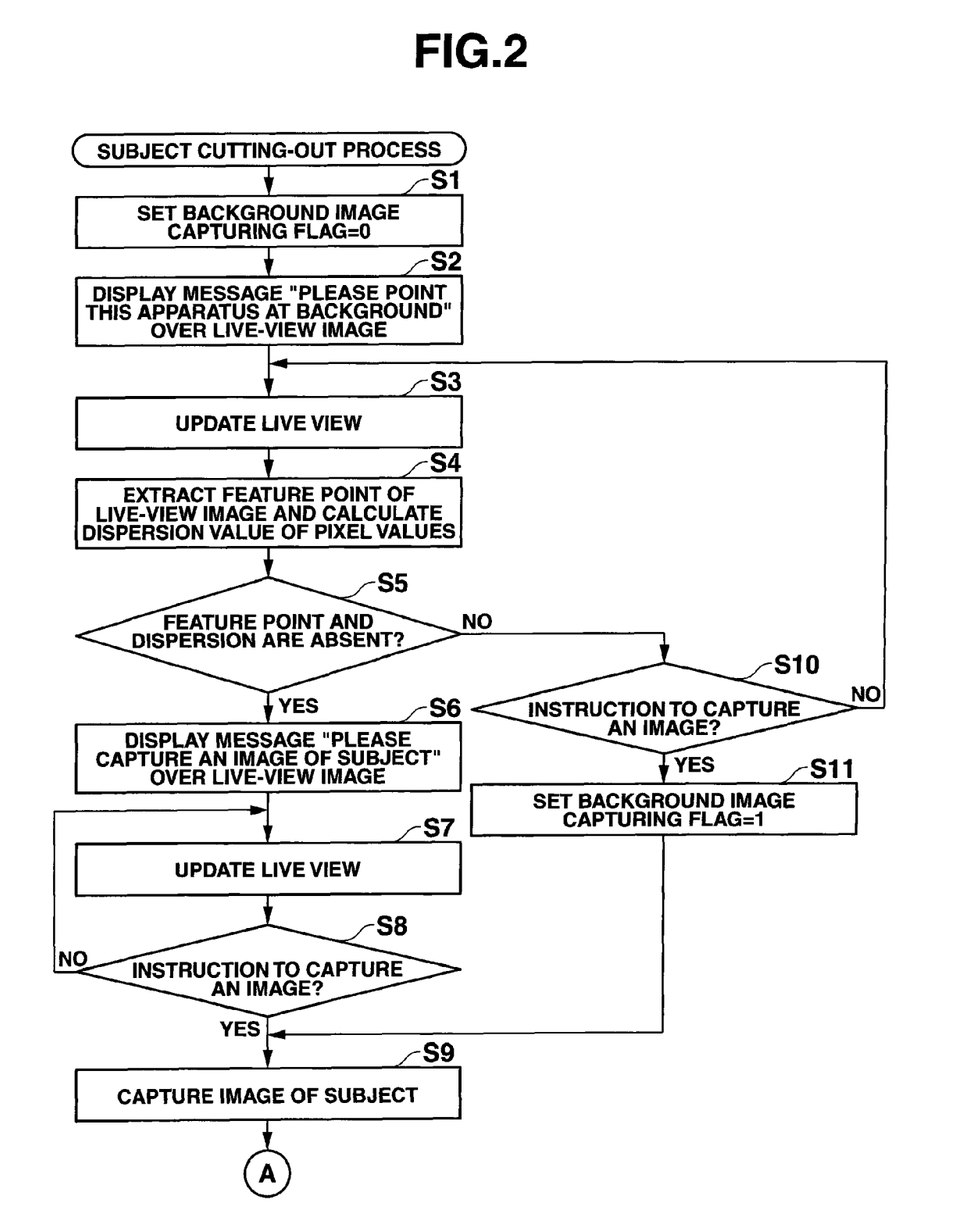
FIG. 2 is a flowchart showing an example of operation relating to a subject cutting-out process to be performed by the image capturing apparatus shown in FIG. 1.
Figure 3:
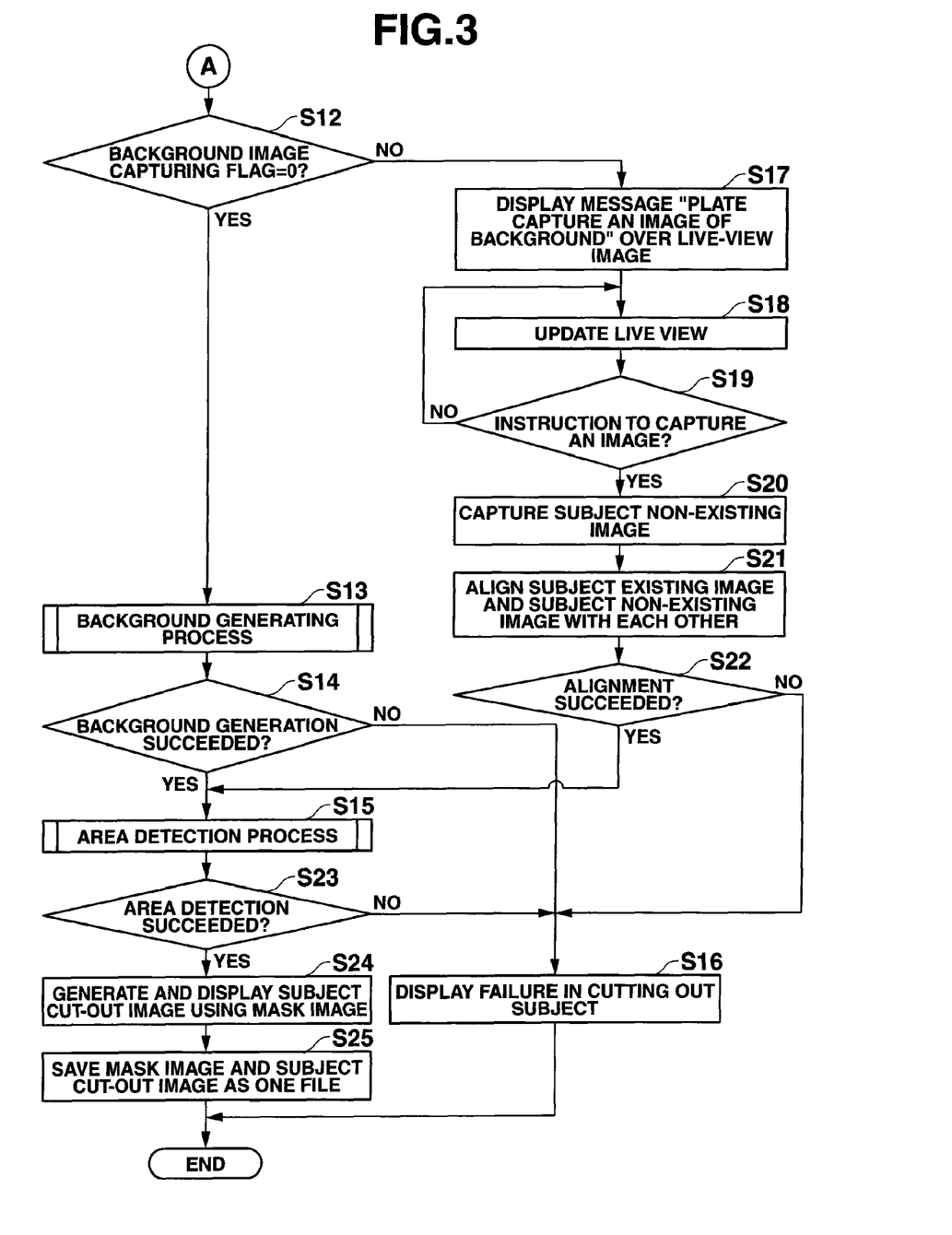
FIG. 3 is a flowchart following the subject cutting-out process of FIG. 2.

FIGS. 2 and 3 are flowcharts showing an example of operation in the subject cutting-out process.

The subject cutting-out process is a process executed when an instruction to select a subject cutting-out mode from a plurality of image capturing modes displayed on the menu screen is issued based on user's predetermined operation on the mode button 12b of the user interface 12.

As shown in FIG. 2, the CPU 13 first writes 0 as a background image capturing flag in a flag table (not shown) of the image memory (Step S1). Then, the CPU 13 makes the display controller 10 display a live-view image on the display screen 11a of the display unit 11 based on image frames generated sequentially by capturing an image of the subject S by the image capturing lens unit 1, the image capturing device 2 and the image capturing controller 3. At the same time, the CPU 13 makes the display controller 10 display a background instruction message (for example, "Please point this apparatus at background") over the live-view image on the display screen 11a of the display unit 11 (Step S2; see FIG. 6A).

Then, the CPU 13 controls the display controller 10 to update the live-view image based on image frames generated sequentially by capturing an image of the subject S by the image capturing lens unit 1, the image capturing device 2 and the image capturing controller 3 (Step S3). Based on the YUV data of the image frames (background image P2) for displaying the live-view image, the CPU 13 makes the feature value calculating module 6a extract a featured block region (feature point) and makes the dispersion value calculating module 6c calculate a standard deviation as a dispersion value in each block region according to Expression (1) (Step S4).

$$\bar{b} = \frac{1}{N}\sum_{n=1}^{N} b_n \qquad (1)$$

$$\sigma_b = \sqrt{\frac{1}{1-N}\sum_{n=1}^{N}(b_n - \bar{b})^2}$$

$$\begin{pmatrix} \text{wherein} \\ b_n: \text{ pixel value in block} \\ N: \text{ number of pixels in block} \\ \bar{b}: \text{ average value of pixel values in block} \\ \sigma_b: \text{ standard deviation in block} \end{pmatrix}$$

Next, the CPU 13 makes the nonflatness determination module 8a determine whether the featured block region extracted by the feature value calculating module 6a is higher than a threshold value or not and determine whether the dispersion value of pixel values in each block of the background image P2 calculated by the dispersion value calculating module 6c is higher than a threshold value or not. Thus, the CPU 13 makes the nonflatness determination module 8a determine whether the feature point and the dispersion value of pixel values in the block are absent or not (Step S5).

Here, when it is determined that the feature point and the dispersion value of pixel values in the block are absent (YES in Step S5), that is, for example, when the subject S is photographed in a solid-color background with a low feature value (see FIG. 6B), the CPU 13 makes the display controller 10 display an image capturing instruction message (for example, "Please take a photograph of subject S") over the live-view image on the display screen 11a of the display unit 11 (Step S6).

After that, the CPU 13 controls the display controller 10 to update the live-view image based on image frames generated sequentially by capturing an image of the subject S by the image capturing lens unit 1, the image capturing device 2 and the image capturing controller 3 (Step S7), and determines whether the user has operated the shutter button 12a of the user interface 12 to issue an image capturing instruction or not (Step S8).

Figure 6C:
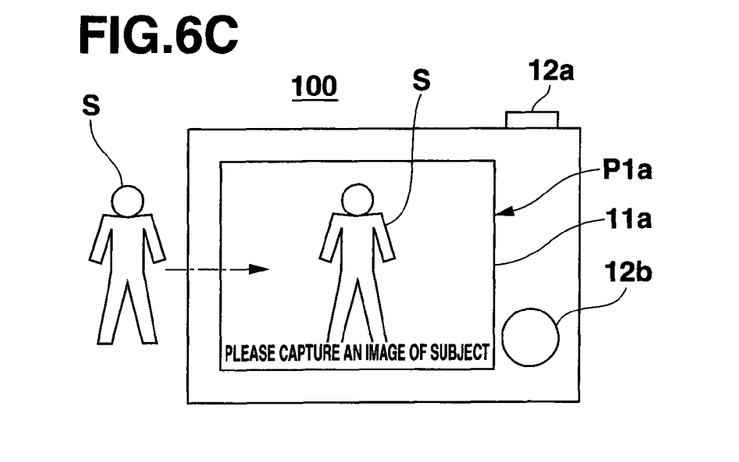

After that, the user moves the subject S within the angle of view or waits for the subject S to move (see FIG. 6C). When it is determined in Step S8 that the user has operated the shutter button 12a to issue an image capturing instruction (YES in Step S8), the CPU 13 makes the image capturing device 2 capture an optical image of the subject existing image P1a on predetermined image capturing conditions. Based on image frames of the subject existing image P1a transmitted from the image capturing device 2, the CPU 13 makes the image data generating unit 4 generate YUV data of the subject existing image P1a, and stores the YUV data into the image memory 5 temporarily (Step S9).

Thus, the subject existing image P1a where the subject S was photographed in the background poor in feature value is generated.

On the other hand, when it is determined in Step S6 that the feature point and the dispersion value of pixel values in the block is not absent (NO in Step S5), that is, for example, when the subject S is photographed in a background rich in feature value (see FIG. 8A), the CPU 13 determines whether the user has operated the shutter button 12a of the user interface 12 to issue an image capturing instruction or not (Step S10).

Here, when it is determined that the user has not operated the shutter button 12a to issue an image capturing instruction (NO in Step S10), the CPU 13 moves processing to Step S3. On the contrary, when it is determined that the user has operated the shutter button 12a to issue an image capturing instruction (YES in Step S10), the CPU 13 writes 1 as a background image capturing flag in the flag table (not shown) of the image memory (Step S11). Then, the CPU 13 moves processing to Step S9, where the subject S is photographed.

Thus, the subject existing image P1b where the subject S was photographed in the background rich in feature value is generated.

Next, as shown in FIG. 3, the CPU 13 determines whether the background image capturing flag is 0 or not (Step S12).

Here, when it is determined that the background image capturing flag is 0 (YES in Step S12), the CPU 13 makes the nonflatness calculating unit 6 and the image processor perform a background generating process where an extracting background image for extracting a subject region is generated from the subject existing image P1a (Step S13).

Here, the background generating process will be described in detail with reference to FIG. 4.

Figure 4:
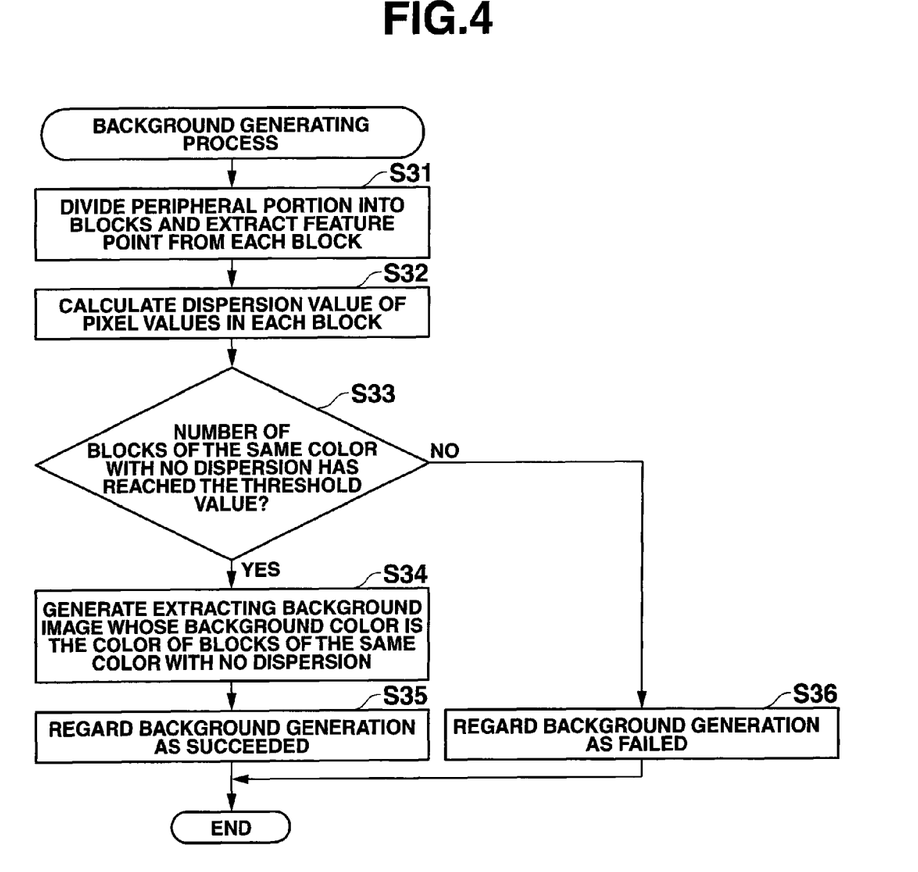
FIG. 4 is a flowchart showing an example of operation relating to a background generating process in the subject cutting-out process of FIG. 2.

FIG. 4 is a flowchart showing an example of operation relating to the background generating process.

As shown in FIG. 4, based on the YUV data of the subject existing image P1a, the dividing module 6b of the nonflatness calculating unit 6 divides the peripheral portion of the subject existing image P1a into a plurality of image blocks B (see FIG. 7A), and extracts a feature point from each image block B (Step S31).

Next, the dispersion value calculating module 6c of the image processor calculates a standard deviation as a dispersion value of pixel values in each of the image blocks B of the peripheral portion of the subject existing image P1a according to Expression (1) (Step S32).

$$\bar{b} = \frac{1}{N}\sum_{n=1}^{N} b_n \tag{1}$$

$$\sigma_b = \sqrt{\frac{1}{1-N}\sum_{n=1}^{N}(b_n - \bar{b})^2}$$

wherein
$b_n$: pixel value in block
$N$: number of pixels in block
$\bar{b}$: average value of pixel values in block
$\sigma_b$: standard deviation in block Next, the nonflatness determination module 8a determines whether the feature point extracted from each image block B of the peripheral portion of the subject existing image P1a is higher than a threshold value or not, and determines whether the dispersion value of the image block B is higher than a threshold value or not. As a result of the determination, the nonflatness determination module 8a counts the number of image blocks B each determined to be not higher than the threshold value as to the feature point and to be not higher than the threshold value as to the dispersion value of pixel values in the block, and then determines whether the counted number of image blocks B is plural or not. Further, of image blocks B determined to have no dispersion, the number of image blocks B of one and the same color is counted. Then, the nonflatness determination module 8a determines whether the number of image blocks B having no dispersion and having the same color reaches at least a threshold value (for example, an half of the total number of blocks of the image) or not (Step S33).

Here, when it is determined that the number of image blocks B having no dispersion and having the same color reaches at least the threshold value (YES in Step S33), the background generating module 8b generates YUV data of the extracting background image having the same background color as the color of the image blocks B (Step S34), and regards background generation as succeeded (Step S35).

On the other hand, when it is determined in Step S33 that the number of image blocks B having no dispersion and having the same color does not reach at least the threshold value (NO in Step S33), for example, even if some image blocks B are stable without dispersion, the background cannot be identified due to absence of blocks of the same color. Thus, the extracting background image is not generated, but the background generation is regarded as failed (Step S36).

Thus, the background generating process is terminated.

As shown in FIG. 3, the CPU 13 next makes the background generating module 8b determine whether the background generation has succeeded or not (Step S14).

Here, when it is determined that the background generation has succeeded (YES in Step S14), the CPU 13 makes the image processor perform an area detection process for detecting a subject region including the subject S from the subject existing image P1a (Step S15).

The area detection process will be described in detail with reference to FIG. 5.

Figure 5:
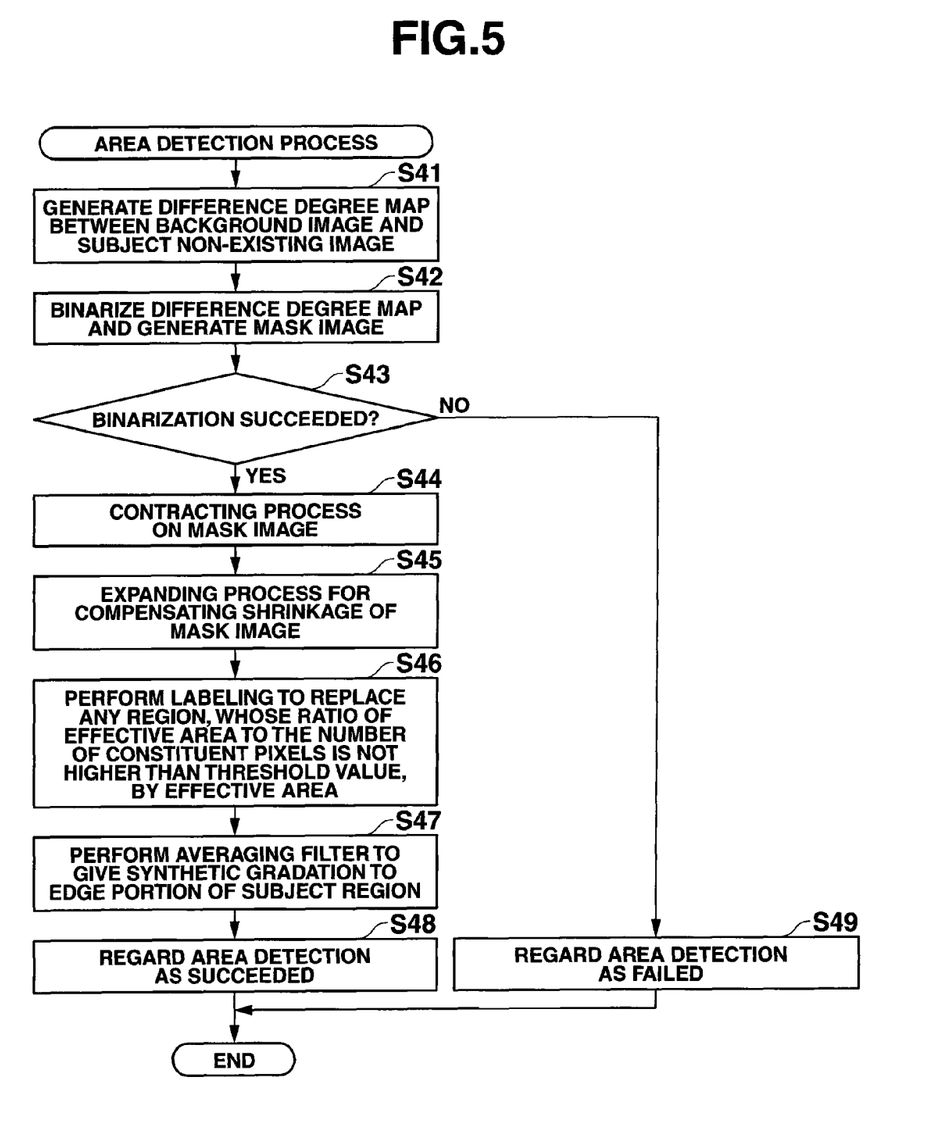
FIG. 5 is a flowchart showing an example of operation relating to an area detection process in the subject cutting-out process of FIG. 2.

FIG. 5 is a flowchart showing an example of operation relating to the area detection process.

As shown in FIG. 5, the mask generating module 8d of the image processor calculates a difference degree D of each corresponding pixel between the YUV data of the extracting background image (background image) and the YUV data of the subject existing image P1a according to Expression (2), and generates a difference degree map (Step S41).

$$D=(Yc-Y)^2+G\times((Uc-U)^2+(Vc-V)^2) \tag{2}$$

Next, the mask generating module 8d binarizes the generated difference degree map with a predetermined threshold to generate mask image data (Step S42). Then, the mask generating module 8d, for example, determines whether the background (binarized to 0) area is extremely small or not, so as to determine whether the binarization has succeeded or not (Step S43).

Here, when it is determined that the binarization has succeeded (YES in Step S43), the mask generating module 8d performs a erosion process on the mask image data to remove pixel sets smaller than a threshold value (Step S44), and then performs an expanding process to compensate the shrinkage (Step S45). Thus, the excessive cutting of the peripheral portion of the subject region can be corrected, and tiny noise can be removed.

If the subject S includes a color similar to the background color, an inner part of the subject region of the mask image will be lost. Therefore, the mask generating module 8d performs a labeling process for labeling pixels sets forming one and the same connected component with one and the same number. Thus, of the mask image data, any region whose ratio of an effective area to the number of constituent pixels is not higher than a threshold value is replaced by an effective area so that filling can be performed (Step S46).

After that, the mask generating module 8d applies an averaging filter to the mask image data to give synthetic gradation to the edge portion of the subject region (Step S47), and regards the area detection as succeeded (Step S48).

On the other hand, when it is determined in Step S43 that the binarization has not succeeded (NO in Step S43), for example, when the background (binarized to 0) area is extremely small, the mask generating module 8d regards the binarization as failed, and regards the area detection as failed (Step S49).

Thus, the area detection process is terminated.

As shown in FIG. 3, when it is determined in Step S14 that the background generation has not succeeded (NO in Step S14), the CPU 13 makes the display screen 11a of the display unit 11 display a predetermined message (for example, "Failed in cutting out subject S") associated with the failure in cutting out the subject S (Step S16). Thus, the subject cutting-out process is terminated.

Figure 8B:
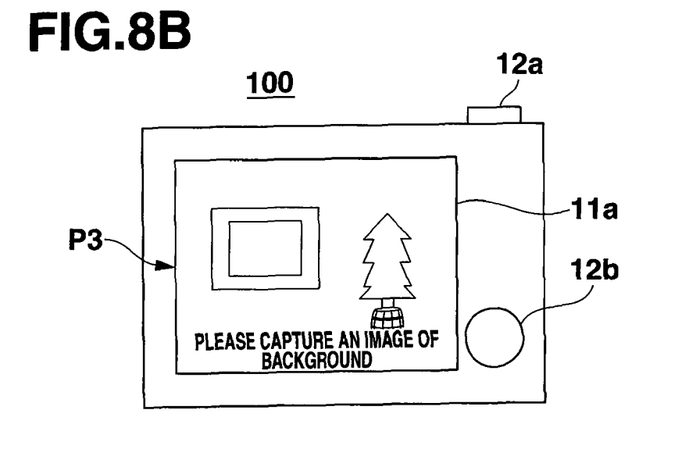

On the other hand, when it is determined in Step S12 that the background image capturing flag is not 0 (NO in Step S12), that is, when the background image capturing flag is 1, the CPU 13 makes the display controller 10 display an image of the subject existing image P1b in a semi-translucent display mode and an image capturing instruction message of the subject nonexisting image P3 (for example, "Please take a photograph of background") over the live-view image on the display screen 11a of the display unit 11 (Step S17; see FIG. 8B).

After that, the CPU 13 controls the display controller 10 to update the live-view image based on image frames generated sequentially by capturing an image of the subject S by the image capturing lens unit 1, the image capturing device 2 and the image capturing controller 3 (Step S18), and determines whether the user has operated the shutter button 12a of the user interface 12 to issue an image capturing instruction or not (Step S19).

After that, the user moves the subject S outside the angle of view or waits for the subject S to move (see FIG. 8B). When it is determined in Step S19 that the user has operated the shutter button 12a to issue an image capturing instruction (YES in Step S19), the CPU 13 makes the image capturing device 2 capture an optical image of the subject nonexisting image P3 on predetermined image capturing conditions. Based on image frames of the subject nonexisting image P3 transmitted from the image capturing device 2, the CPU 13 makes the image data generating unit 4 generate YUV data of the subject nonexisting image P3, and stores the YUV data into the image memory 5 temporarily (Step S20).

Thus, the subject nonexisting image P3 where the subject S is absent and the background rich in feature value is captured is generated.

Next, the CPU 13 makes the nonflatness calculating unit 6, the block matching unit 7 and the image processor 8 perform a process for alignment between the YUV data of the subject existing image P1b and the YUV data of the subject nonexisiting image P3 with reference to the YUV data of the subject nonexisting image P3 (Step S21).

Specifically, based on the YUV data of the subject nonexisting image P3, the feature value calculating module 6a selects a predetermined number (or more) of featured block regions (feature points), and extracts the contents of the selected block regions as templates. The block matching unit 7 searches for the position where pixel values of each template extracted in the feature extracting process match optimally in the subject existing image P1b. Then, the optimal offset between the subject nonexisting image P3 and the subject existing image P1b with the best estimated value of the difference degree of the pixel values is calculated as a motion vector of the template.

Then, the alignment module 8c of the image processor 8 statistically calculates a general motion vector based on the motion vectors of the templates calculated by the block matching unit 7. A projective transformation matrix of the subject existing image P1b is calculated using a feature point correspondence according to the general motion vector. The subject existing image P1b is projectively transformed using the projective transformation matrix. Thus, the process for alignment between the YUV data of the subject existing image P1b and the YUV data of the subject nonexisting image P3 is performed.

Next, the CPU 13 makes the image processor 8 determine whether the alignment has succeeded or not (Step S22). That is, in Step S21, the image processor 8 determines whether the general motion vector could be calculated statistically from the motion vectors of the templates or not and whether the projective transformation matrix of the subject existing image P1b could be calculated from the feature point correspondence according to the general motion vector or not.

Here, when it is determined that the alignment has succeeded (YES in Step S22), the CPU 13 moves processing to Step S15, where the CPU 13 makes the mask generating module 8d of the image processor 8 perform an area detection process (see FIG. 5) (Step S15).

The area detection process in this time is substantially the same as the aforementioned contents, except that the subject nonexisting image P3 is used as the background image. The detailed description thereof will be omitted. That is, the mask generating module 8d calculates a difference degree D of each corresponding pixel between the YUV data of the subject nonexisting image P3 as the background image and the YUV data of the subject existing image P1b according to Expression (2), and generates a difference degree map (Step S41).

$$D=(Y_c-Y)^2+G\times((U_c-U)^2+(V_c-V)^2) \quad (2)$$

After that, as described above, the mask generating module 8d performs the process for binarizing the difference degree map to generate mask image data (Step S42), the process for determining whether the binarization has succeeded or not (Step S43), the erosion process on the mask image data (Step S44), the dilation process for compensating the erosion (Step S45), the process for labeling to replace any region of the mask image data with a predetermined ratio or lower by an effective area (Step S46), the process for applying an averaging filter to the mask image data to give synthetic gradation to the edge portion of the subject region (Step S47), etc.

On the other hand, when it is determined in Step S21 that the alignment has not succeeded (NO in Step S21), the CPU 13 moves processing to Step S16, where the CPU 13 makes the display screen 11a of the display unit 11 display a predetermined message relating to the failure in cutting out the subject S (Step S16). Thus, the subject cutting-out process is terminated.

After the area detection process (Step S15) is terminated, the CPU 13 makes the mask generating module 8d determine whether the detection of the subject region has succeeded or not (Step S23).

Here, when it is determined that the detection of the subject region has succeeded (YES in Step S23), the CPU 13 makes the cut-out image generating module 8e cut out the subject region from the subject existing image P1a (P1b) using the mask image generated in the area detection process and combine the subject region with a predetermined single-color background image P5. Thus, image data of a subject cut-out image P4 (see FIG. 7B) is generated by use of chroma-key (Step S24).

Specifically, the cut-out image generating module 8e reads out the subject existing image P1a (P1b), the single-color background image P5 and the mask image data and expands them in the image memory 5. Of the subject existing image P1a (P1b), pixels covered with a part filled with the mask image data (the other part than the subject S) are filled with the predetermined single color of the single-color background image P5. On the other hand, pixels of the subject part are left as they are, so as to be prevented from transmitting the predetermined single color. Due to synthetic gradation given to the edge portion of the mask image, the cut-out subject region and the single-color background image P5 can be combined naturally with an indefinable boundary therebetween.

Figure 7C:
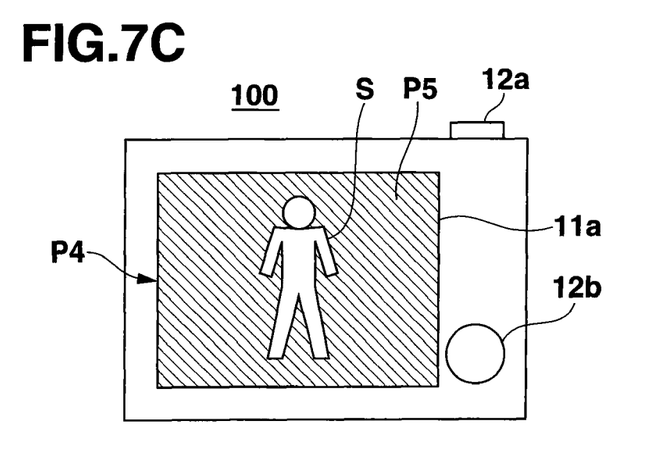

After that, based on the image data of the subject cut-out image P4 generated by the cut-out image generating module 8e, the CPU 13 makes the display controller 10 display, on the display screen 11a of the display unit 11, the subject cut-out image P4 where the subject S is laid over the predetermined single-color background image P5 (see FIG. 7C).

Next, the CPU 13 associates the mask image data generated by the mask generating module 8d of the image processor 8 and the image data of the subject cut-out image P4 with a predetermined storage area of the recording medium 9, and saves the image data of the subject cut-out image P4 as one file with an extension of ".jpe" (Step S25).

In this manner, the subject cut-out process is terminated.

On the other hand, when it is determined in Step S23 that the alignment has not succeeded (NO in Step S22), the CPU 13 moves processing to Step S16, where the CPU 13 makes the display screen 11a of the display unit 11 display a predetermined message relating to the failure in cutting out the subject S (Step S16). Then, the subject cutting-out process is terminated.

As described above, according to the image capturing apparatus 100 in this embodiment, it is determined whether the nonflatness of the peripheral portion of the subject existing image P1a where the subject S exists in the background is higher than a threshold value or not. When it is determined that the nonflatness is not higher than the threshold value, an extracting background image for extracting a subject region is generated from the peripheral portion of the subject existing image P1a. Based on a difference degree D of each corresponding pixel between the extracting background image and the subject existing image P1a, the subject region is extracted from the subject existing image P1a to generate a subject cut-out image P4.

Specifically, the peripheral portion of the subject existing image P1a is divided into a plurality of image blocks B. A feature point is extracted from each of the image blocks B. It is determined whether the feature point of each of the image blocks B is higher than a threshold value or not. In addition, it is determined whether a dispersion value of pixel values in each of the image blocks B is higher than a threshold value or not. When there are plural image blocks B each determined to be not higher than the threshold value as to the feature value and to be not higher than the threshold value as to the dispersion value of pixel values in the block, an extracting background image whose color is the same as the color of the peripheral portion of the subject existing image P1a is generated. A mask image is generated based on a difference degree D of each corresponding pixel between the extracting background image and the subject existing image P1a. A subject region is extracted from the subject existing image P1a using the mask image.

Thus, by single shot of the subject existing image P1a, the extracting background image can be generated without capturing another background image P2 separately. A subject region can be extracted simply and easily from the subject existing image P1a by use of the mask image generated using the extracting background image.

In addition, the peripheral portion of the subject existing image P1a is divided into a plurality of image blocks B. For each image block B, it is determined whether there are plural image blocks B of the same color in the peripheral portion of the subject existing image P1a or not, and it is determined whether there is a dispersion of pixel values in the block or not. Thus, it is possible to properly determine whether the background image includes a solid-color and single-color background suitable for generating an extracting background image or not.

A feature point is extracted from image frames of the background image P2 generated sequentially as image frames for displaying a live-view image, and it is determined whether the feature point of the background image P2 is higher than a threshold value or not. In addition, it is determined whether the dispersion value of pixel values in a plurality of blocks of the background image P2 is higher than a threshold value or not. For example, as in the case where the subject S is photographed in a background with a low feature value (see FIG. 6B), when it is determined that the feature point is not higher than the threshold value and the dispersion value of pixel values in the blocks is not higher than the threshold value, the subject existing image P1a where the subject S exists in the background substantially the same as the background image P2 is captured so that an extracting background image can be generated from the peripheral portion of the subject existing image P1a.

In this manner, image frames for displaying a live-view image are used so that the most suitable environment for cutting out the subject S can be found out, and a more user-friendly image capturing apparatus can be provided.

On the other hand, for example, as in the case where the subject S is photographed in a background rich in feature value (see FIG. 8A), when it is determined that the feature point is higher than the threshold value, a subject nonexisting image P3 where the subject S is absent in the same background as the background of the subject existing image P1b is captured after the subject existing image P1b is captured. After alignment between the subject existing image P1b and the subject nonexisting image P3, a subject region can be extracted from the subject existing image P1b based on the difference degree D of each corresponding pixel between the subject existing image P1b and the subject nonexisting image P3 aligned with each other.

That is, even when the subject nonexisting image P3 is captured in the case where the subject S is photographed in a background rich in feature value, a subject region can be extracted from the subject existing image P1b using a mask image generated based on the difference degree D of each corresponding pixel between the subject existing image P1b and the subject nonexisting image P3.

The present invention is not limited to the aforementioned embodiment. Various modifications and design changes can be made on the invention without departing from the scope and spirit of the invention.

For example, although both whether the feature point of each of the image blocks B of the peripheral portion of the subject existing image P1a is higher than a threshold value or not and whether the dispersion value of pixel values in the block is higher than a threshold value or not are determined to generate an extracting background image, the invention is not limited thereto. At least one of the feature point and the dispersion value may be determined to determine the nonflatness of each image block B. In this case, when it is determined that the nonflatness is not higher than a threshold value, the extracting background image is generated.

In addition, although both whether the feature point of image frames of the background image P2 generated for displaying a live-view image is higher than a threshold value or not and whether the dispersion value of pixel values in the blocks are determined when the live-view image is displayed, the invention is not limited thereto. At least one of the feature point and the dispersion value may be determined to determine the nonflatness of the background image. In this case, when it is determined that the nonflatness is not higher than a threshold value, the subject existing image P1a where the subject S exists in substantially the same background as the background image P2 is captured.

Further, the generated subject cut-out image P4 and a predetermined background image (not shown) may be combined to generate a subject combined image (not shown).

In a process for generating the subject combined image, image data of the subject cut-out image P4 is processed so that pixels covered with a part filled with mask image data (the other part than the subject S) are filled with the color of the background image, while pixels of a subject part are left as they are, so as to be prevented from transmitting the color of the predetermined background image. Thus, a subject combined image where the subject region of the subject cut-out image P4 is superposed on the predetermined background image (not shown) can be generated.

Although the mask image data and the image data of the subject cut-out image P4 are associated with each other and saved as one file in the aforementioned embodiment, the mask image data and the image data of the subject existing image P1a may be associated with each other and saved as one file in the recording medium (storage unit) 9. In this case, two modes may be prepared for reproducing the file. That is, one is a mode to reproduce the subject existing image P1a, and the other is a mode to apply the mask image data at the time of reproducing and display the subject cut-out image P4 combined therewith.

Further, the configuration of the image capturing apparatus 100 is exemplified in the aforementioned embodiment. The invention is not limited thereto.

In addition, according to the aforementioned embodiment, functions as the extracting unit, the determination unit, the background generating unit and the subject extracting unit are designed to be achieved by the image processor 8 driven under the control of the CPU 13. The invention is not limited thereto. Those functions may be implemented by a configuration where a predetermined program or the like is executed by the CPU 13.

That is, a program including a nonflatness calculating process routine, a determination process routine, a background generating process routine and a subject extracting process routine is stored in a program memory (not shown) for storing programs. The nonflatness calculating process routine may make the CPU 13 function as the nonflatness calculating unit that calculates the nonflatness of the peripheral portion of the subject existing image P1a captured by the image capturing unit. In addition, the determination process routine may make the CPU 13 function as the determination unit that determines whether the nonflatness of the peripheral portion of the subject existing image P1a extracted by the extraction process is higher than a threshold value or not. In addition, the background generating process routine may make the CPU 13 function as the background generating unit that generates an extracting background image, which is used for extracting a subject region where the subject S is included in the subject existing image P1a, from the peripheral portion of the subject existing image P1a when it is determined in the determination process that the nonflatness is not higher than the threshold value. In addition, the subject extracting process routine may make the CPU 13 function as the subject extracting unit that extracts a subject region from the subject existing image P1a based on difference information of each corresponding pixel between the extracting background image and the subject existing image P1a.

What is claimed is:

1. An image capturing apparatus comprising:
   an image capturing unit that captures a subject existing image in which a subject is present in a background;
   a dividing unit that divides a peripheral portion of the subject existing image into a plurality of image regions;
   a nonflatness calculating unit that calculates nonflatness by extracting a feature point from each of the image regions divided by the dividing unit;
   a determination unit that determines whether each of the feature points of the image regions extracted by the nonflatness calculating unit is higher than a first threshold value;
   a background generating unit that generates an extracting background image from the peripheral portion of the subject existing image when the determination unit determines that each of the feature points is not higher than the first threshold value, the extracting background image serving to extract a subject region containing the subject in the subject existing image; and
   a subject extracting unit that extracts the subject region from the subject existing image based on difference information of each corresponding pixel between the extracting background image and the subject existing image.

2. The image capturing apparatus according to claim 1,
   wherein the nonflatness calculating unit calculates each of dispersion values of pixel values as the nonflatness in the image regions divided by the dividing unit,
   wherein the determination unit further determines whether each of the dispersion values of the pixel values in the image regions calculated by the nonflatness calculating unit is higher than a second threshold value, and
   wherein the background generating unit generates the extracting background image from the peripheral portion of the subject existing image when the determination unit determines that each of the dispersion values of the pixel values is not higher than the second threshold value.

3. The image capturing apparatus according to claim 1, wherein the background generating unit generates the extracting background image having a same color as the peripheral portion of the subject existing image.

4. The image capturing apparatus according to claim 1, further comprising:
a mask generating unit that generates a mask image for extracting the subject region from the subject existing image based on the difference information of each corresponding pixel between the extracting background image and the subject existing image,
wherein the subject extracting unit extracts the subject region from the subject existing image using the mask image generated by the mask generating unit.

5. An image capturing apparatus comprising:
a first image capturing unit that captures a subject existing image in which a subject is present in a background;
a first nonflatness calculating unit that calculates nonflatness of a peripheral portion of the subject existing image captured by the first image capturing unit;
a first determination unit that determines whether the nonflatness of the peripheral portion of the subject existing image calculated by the first nonflatness calculating unit is higher than a first threshold value;
a background generating unit that generates an extracting background image from the peripheral portion of the subject existing image when the first determination unit determines that the nonflatness is not higher than the first threshold value, the extracting background image serving to extract a subject region containing the subject in the subject existing image;
a subject extracting unit that extracts the subject region from the subject existing image based on difference information of each corresponding pixel between the extracting background image and the subject existing image;
a background image capturing unit that captures a background image in which the subject is absent and generates image frames of the background image sequentially;
a second nonflatness calculating unit that calculates nonflatness of each of the image frames of the background image; and
a second determination unit that determines whether the nonflatness of each of the image frames of the background image calculated by the second nonflatness calculating unit is higher than a second threshold value,
wherein the first image capturing unit captures a subject existing image in which the subject is present in a substantially same background as the background image when the second determination unit determines that the nonflatness is not higher than the second threshold value.

6. The image capturing apparatus according to claim 5,
wherein the second nonflatness calculating unit extracts a feature point as the nonflatness from the background image,
wherein the second determination unit further determines whether each of feature points extracted from a plurality of image regions of the background image by the second nonflatness calculating unit is higher than a third threshold value, and wherein the first image capturing unit captures the subject existing image when the second determination unit determines that each of the feature points is not higher than the third threshold value.

7. The image capturing apparatus according to claim 5,
wherein the second nonflatness calculating unit calculates dispersion values of pixel values in a plurality of image regions of the background image,
wherein the second determination unit further determines whether each of the dispersion values of the pixel values in the image regions of the background image calculated by the second nonflatness calculating unit is higher than a third threshold value, and
wherein the first image capturing unit further captures the subject existing image when the second determination unit determines that each of the dispersion values of the pixel values in the image regions is not higher than the third threshold value.

8. The image capturing apparatus according to claim 5, further comprising:
a second image capturing unit that captures a subject nonexisting image where the subject is absent in a same background as the background of the subject existing image after the subject existing image is captured when the second determination unit determines that the nonflatness is higher than the second threshold value; and
an alignment unit that performs alignment between the subject existing image and the subject nonexisting image,
wherein the subject extracting unit extracts the subject region from the subject existing image based on difference information of each corresponding pixel between the subject existing image and the subject nonexisting image aligned with each other by the alignment unit.

9. A method for processing an image by an image capturing apparatus comprising an image capturing unit that captures a subject existing image in which a subject is present in a background, the method comprising:
dividing a peripheral portion of the subject existing image into a plurality of image regions;
calculating nonflatness by extracting a feature point from each of the image regions;
determining whether each of the extracted feature points of the image regions is higher than a threshold value;
generating an extracting background image from the peripheral portion of the subject existing image when it is determined that each of the feature points is not higher than the threshold value, the extracting background image serving to extract a subject region containing the subject in the subject existing image; and
extracting the subject region from the subject existing image based on difference information of each corresponding pixel between the extracting background image and the subject existing image.

10. A non-transitory computer readable storage medium having a program stored thereon for controlling a computer of an image capturing apparatus, wherein the image capturing apparatus comprises an image capturing unit that captures a subject existing image in which a subject is present in a background, and wherein the program controls the computer to perform image processing functions comprising:
dividing a peripheral portion of the subject existing image into a plurality of image regions;
calculating nonflatness by extracting a feature point from each of the image regions;
determining whether each of the extracted feature points of the image regions is higher than a threshold value;

generating an extracting background image from the peripheral portion of the subject existing image when it is determined that each of the feature points is not higher than the threshold value, the extracting background image serving to extract a subject region containing the subject in the subject existing image; and extracting the subject region from the subject existing image based on difference information of each corresponding pixel between the extracting background image and the subject existing image.

11. A method for processing an image by an image capturing apparatus comprising an image capturing unit that captures a subject existing image in which a subject is present in a background, the method comprising:

calculating nonflatness of a peripheral portion of the subject existing image captured by the first image capturing unit;

determining whether the nonflatness of the peripheral portion of the subject existing image is higher than a first threshold value;

generating an extracting background image from the peripheral portion of the subject existing image when it is determined that the nonflatness is not higher than the first threshold value, the extracting background image serving to extract a subject region containing the subject in the subject existing image;

extracting the subject region from the subject existing image based on difference information of each corresponding pixel between the extracting background image and the subject existing image;

capturing a background image in which the subject is absent and generating image frames of the background image sequentially;

calculating nonflatness of each of the image frames of the background image;

determining whether the nonflatness of each of the image frames of the background image is higher than a second threshold value; and capturing a subject existing image in which the subject is present in a substantially same background as the background image when it is determined that the nonflatness of each of the image frames of the background image is not higher than the second threshold value.

12. A non-transitory computer readable storage medium having a program stored thereon for controlling a computer of an image capturing apparatus, wherein the image capturing apparatus comprises an image capturing unit that captures a subject existing image in which a subject is present in a background, and wherein the program controls the computer to perform image processing functions comprising:

calculating nonflatness of a peripheral portion of the subject existing image captured by the first image capturing unit;

determining whether the nonflatness of the peripheral portion of the subject existing image is higher than a first threshold value;

generating an extracting background image from the peripheral portion of the subject existing image when it is determined that the nonflatness is not higher than the first threshold value, the extracting background image serving to extract a subject region containing the subject in the subject existing image;

extracting the subject region from the subject existing image based on difference information of each corresponding pixel between the extracting background image and the subject existing image;

capturing a background image in which the subject is absent and generating image frames of the background image sequentially;

calculating nonflatness of each of the image frames of the background image;

determining whether the nonflatness of each of the image frames of the background image is higher than a second threshold value; and capturing a subject existing image in which the subject is present in a substantially same background as the background image when it is determined that the nonflatness of each of the image frames of the background image is not higher than the second threshold value.

* * * * *